(12) United States Patent
Manohar et al.

(10) Patent No.: US 9,948,181 B2
(45) Date of Patent: Apr. 17, 2018

(54) CIRCUITS AND METHODS TO LINEARIZE CONVERSION GAIN IN A DC-DC CONVERTER

(71) Applicant: Texas Instruments Incorporated, Dallas, TX (US)

(72) Inventors: Sujan K. Manohar, Dallas, TX (US); Angelo W. Pereira, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/720,641

(22) Filed: May 22, 2015

(65) Prior Publication Data

US 2015/0340952 A1 Nov. 26, 2015

Related U.S. Application Data

(60) Provisional application No. 62/002,475, filed on May 23, 2014.

(51) Int. Cl.
*H02M 3/158* (2006.01)
*H02M 3/156* (2006.01)
(Continued)

(52) U.S. Cl.
CPC ........... *H02M 3/158* (2013.01); *H02M 3/156* (2013.01); *H02M 2001/0025* (2013.01)

(58) Field of Classification Search
CPC ...... H02M 3/158; H02M 3/156; H02M 3/157; H02M 2003/1566; H02M 3/1588;
(Continued)

(56) References Cited

U.S. PATENT DOCUMENTS

| 8,358,118 B2 * | 1/2013 | Chen ..................... H02M 3/156 323/222 |
| 2007/0069703 A1 * | 3/2007 | Kokubun ............ H02M 3/1588 323/282 |

(Continued)

FOREIGN PATENT DOCUMENTS

| EP | 2482433 A2 * | 8/2012 | ............ H02M 3/156 |
| EP | 2482433 A3 | 8/2012 | |

OTHER PUBLICATIONS

Lo et al., "Improved Control-to-Output Characteristics of a PWM Buck-Boost Converter", Int'l J. Cir. Theor. Appl., 2011; 39:203-209, Published online Mar. 22, 2010 in Wiley Online Library (wileyonlinelibrary.com), pp. 203-209.

(Continued)

*Primary Examiner* — Timothy J Dole
*Assistant Examiner* — Sisay G Tiku
(74) *Attorney, Agent, or Firm* — Tuenlap D. Chan; Charles A. Brill; Frank D. Cimino (57) ABSTRACT

Described examples include DC-DC power conversion systems, apparatus and methods for linearizing a DC-DC circuit conversion gain, including a gain circuit providing an output signal according to a gain value and the difference between a first compensation signal and a threshold signal, and a switching circuit selectively operative when the first compensation signal exceeds the threshold signal to linearize the conversion gain by providing a second compensation signal for pulse width modulation of at least one DC-DC converter switch according to the threshold signal and the gain circuit output signal.

17 Claims, 8 Drawing Sheets

(51) Int. Cl.
*H02M 3/157* (2006.01)
*H02M 3/335* (2006.01)
*H02M 1/00* (2006.01)

(58) Field of Classification Search
CPC ......... H02M 3/33515; H02M 3/33507; H02M 2001/0025; H02M 2001/0045
USPC .......................................... 363/280–283, 351
See application file for complete search history.

(56) References Cited

U.S. PATENT DOCUMENTS

| | | | | |
|---|---|---|---|---|
| 2010/0194362 A1* | 8/2010 | Egawa | ................... | H02M 3/156 323/282 |
| 2011/0101949 A1* | 5/2011 | Lopata | ................ | H02M 3/1588 323/286 |
| 2012/0120693 A1* | 5/2012 | Sauer | ........................ | H02J 3/32 363/89 |
| 2012/0300520 A1* | 11/2012 | Ren | .......................... | H02M 1/32 363/127 |
| 2014/0009130 A1* | 1/2014 | Galbis | ................... | H02M 3/156 323/271 |
| 2014/0176107 A1* | 6/2014 | Yu | ........................... | H02M 1/08 323/285 |
| 2014/0320098 A1* | 10/2014 | Izumoto | ................ | H02M 3/156 323/282 |
| 2015/0091544 A1* | 4/2015 | Jayaraj | .................. | H02M 3/156 323/284 |
| 2015/0372613 A1* | 12/2015 | Houston | ............... | H02M 3/158 307/31 |

OTHER PUBLICATIONS

Lo et al, "Linearization of the Control-to-Output Transfer Function for a PWM Buck-Boost Converter", IEEE Int'l Symp., May 4-7, 2004, pp. 875-877.
Bryant et al., "Voltage Loop of Boost PWM DC-DC Converters With Peak Current-Mode Control", IEEE Transactions on Circuits and Systems—I: Regular Papers, vol. 53, No. 1, Jan. 2006, pp. 99-105.
Liebal et al., "Control of DC-DC Buck-Boost Converter Using Exact Linearization Techniques", 24th Annual IEEE Power Electronics Specialists Conf., Jun. 20-24, 1993, PESC '93 Record., pp. 203-207.
Michal, "Modulated-Ramp PWM Generator for Linear Control of the Boost Converter's Power Stage", IEEE Transactions on Power Electronics, vol. 27, No. 6, Jun. 2012, pp. 2958-2965.
Rober W. Erickson, "DC-DC Power Converters," Article in Wiley Encyclopedia of Electrical and Electronics Engineering, no date (5 pages).
Rober W. Erickson, "DC-DC Power Converters," Article in Wiley Encyclopedia of Electrical and Electronics Engineering, , Wiley Online Library, published Jun. 15, 2007 (4 pages).

* cited by examiner

CIRCUITS AND METHODS TO LINEARIZE CONVERSION GAIN IN A DC-DC CONVERTER

The present application claims priority to and the benefit of U.S. Provisional Patent Application Ser. No. 62/002,475, filed May 23, 2014 and entitled CIRCUITS AND METHODS TO LINEARIZE CONVERSION GAIN IN A DC-DC CONVERTER, the entirety of which is hereby incorporated by reference.

TECHNICAL FIELD

The present disclosure relates to power conversion and more particularly to circuits and methods to linearize conversion gain in a DC-DC converter.

BACKGROUND

CMOS technology is being aggressively scaled to reduce physical dimensions and supply voltage to meet low power, low area and high performance specifications in portable electronics and other applications. Also, new battery chemistries seek to extend device usage to lower voltages. However, certain loads like piezo-electric speakers, LED drivers, micro electromechanical device (MEMs) sensors, Camera flash, USB on-the-go (USB-OTG) circuitry, etc. require regulated high voltages for proper operation, and are generally powered using boost converters or buck-boost converters. Reduced system and battery voltages which serve as input supplies result in higher conversion ratios for these converters. Certain system features employing dynamic voltage scaling (DVS) also result in variable conversion ratios. There is a growing demand for high conversion gain boost and buck-boost converters. The conversion gain M of a boost converter is given as the ratio of the output voltage VOUT to the input voltage VIN ($M=VOUT/VIN=1/(1-D)$). D is the duty cycle or duty ratio representing the percentage of time that the main DC-DC converter switch is on, and higher conversion gain M results from higher duty cycle operation. The converter small signal gain $G_C$ depends upon the duty ratio D ($G_C=\delta VOUT/\delta D=1/(1-D)^2$), where the gain $G_C$ is non-linear and increases with rising duty cycles. At high converter gain, small variations in the duty cycle results in large converter output voltage changes and increased likelihood of converter instability. Higher duty cycle operation also results in increased di/dt, increased EMI and higher output voltage sensitivity to duty cycle changes due to noise and jitter. High gain stability and noise issues have previously been addressed by feedback linearization or pre-distortion. Feedback linearization requires complex implementations and high digital hardware cost. Many pre-distortion systems employ low pass filters which increase the loop delay, as well as inverse computation in the analog domain which is typically inaccurate. Some pre-distortion techniques also use analog multipliers in the feedback loop which increases circuit cost and space. Another approach uses modulated ramps, and works well for open loop control where output voltage accuracy is not a concern. However, use of modulated ramp techniques in closed loop application requires control current generation using an op-amp or inductor for modulating the ramp, and this approach is not well suited for hysteretic mode control where switching period is variable with load and hence affects control gain $G_C$.

SUMMARY

In described examples, DC-DC power conversion systems and linearization apparatus include a gain circuit providing an output signal according to a gain value and the difference between a first compensation signal and a threshold signal. In certain examples, the gain circuit output signal is based on a ratio of the difference between the first compensation signal and the threshold signal divided by the gain value. In one example, the gain value is greater than unity and is adjustable or programmable. A switching circuit selectively operates to linearize the system conversion gain by providing a second compensation signal for pulse width modulation of at least one DC-DC converter switch according to the threshold signal and the gain circuit output signal when the first compensation signal exceeds the threshold signal. When the first compensation signal is below the threshold signal, the second compensation signal is provided according to the first compensation signal. Certain examples include a circuit to selectively adjust the threshold signal. In other described examples, a method of linearizing a DC-DC converter gain includes receiving a first compensation signal, operating the DC-DC converter according to a second compensation signal, generating a gain circuit output signal according to a non-zero gain value and a difference between the first compensation signal and a threshold signal. The method further includes providing the second compensation signal according to the first compensation signal if the first compensation signal is less than the threshold signal, and selectively providing the second compensation signal according to the threshold signal and the gain circuit output signal if the first compensation signal is greater than the threshold signal.

DETAILED DESCRIPTION

In the drawings, like reference numerals refer to like elements throughout, and the various features are not necessarily drawn to scale.

Figure 1:
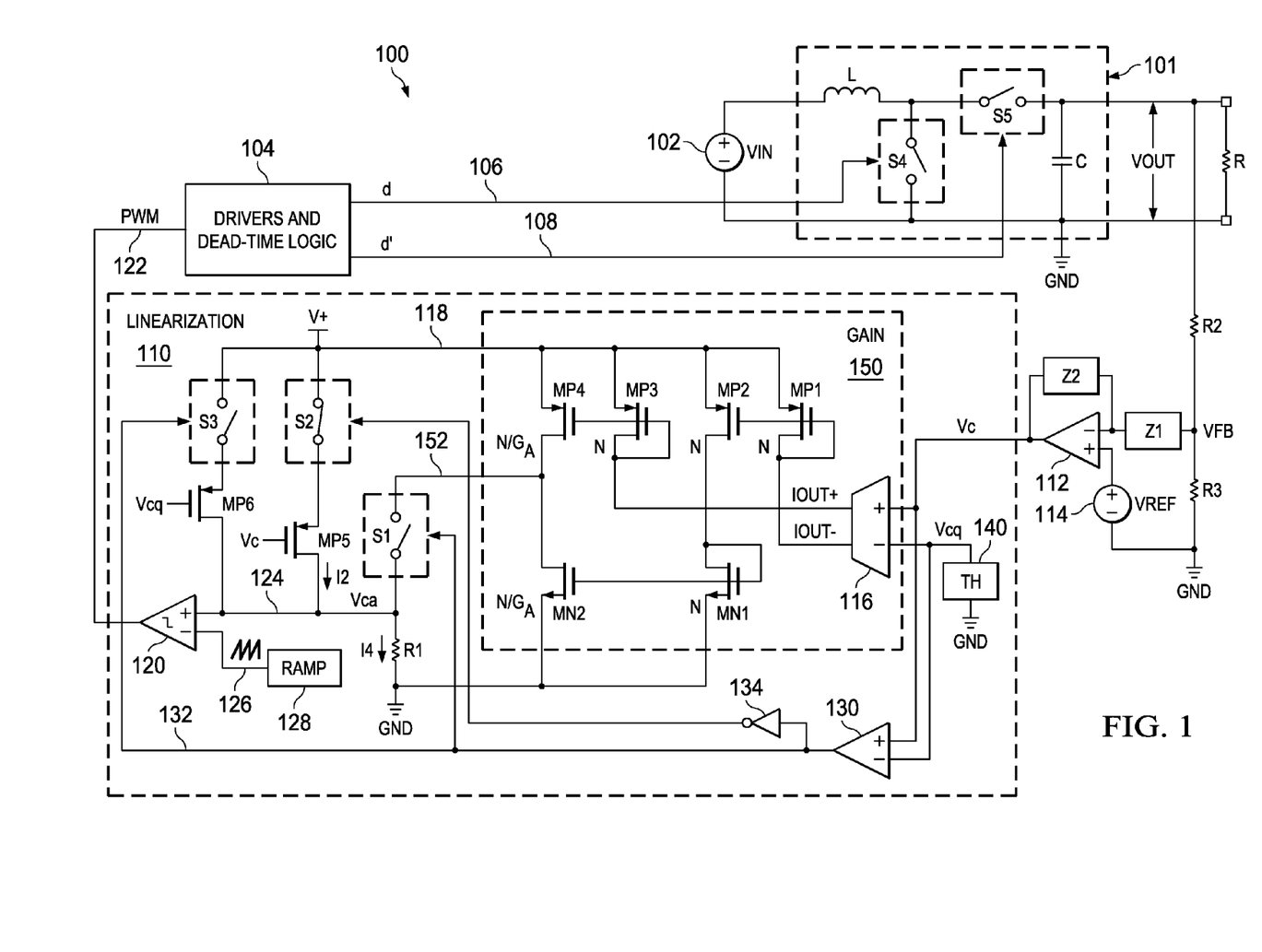
FIG. 1 is a schematic diagram of a DC-DC power conversion system including a boost converter stage and a linearization apparatus in low duty cycle operation in a first mode for pulse width modulation of at least one DC-DC converter switch according to a first compensation signal representing a difference between a DC-DC converter output and a reference signal.
Figure 2:
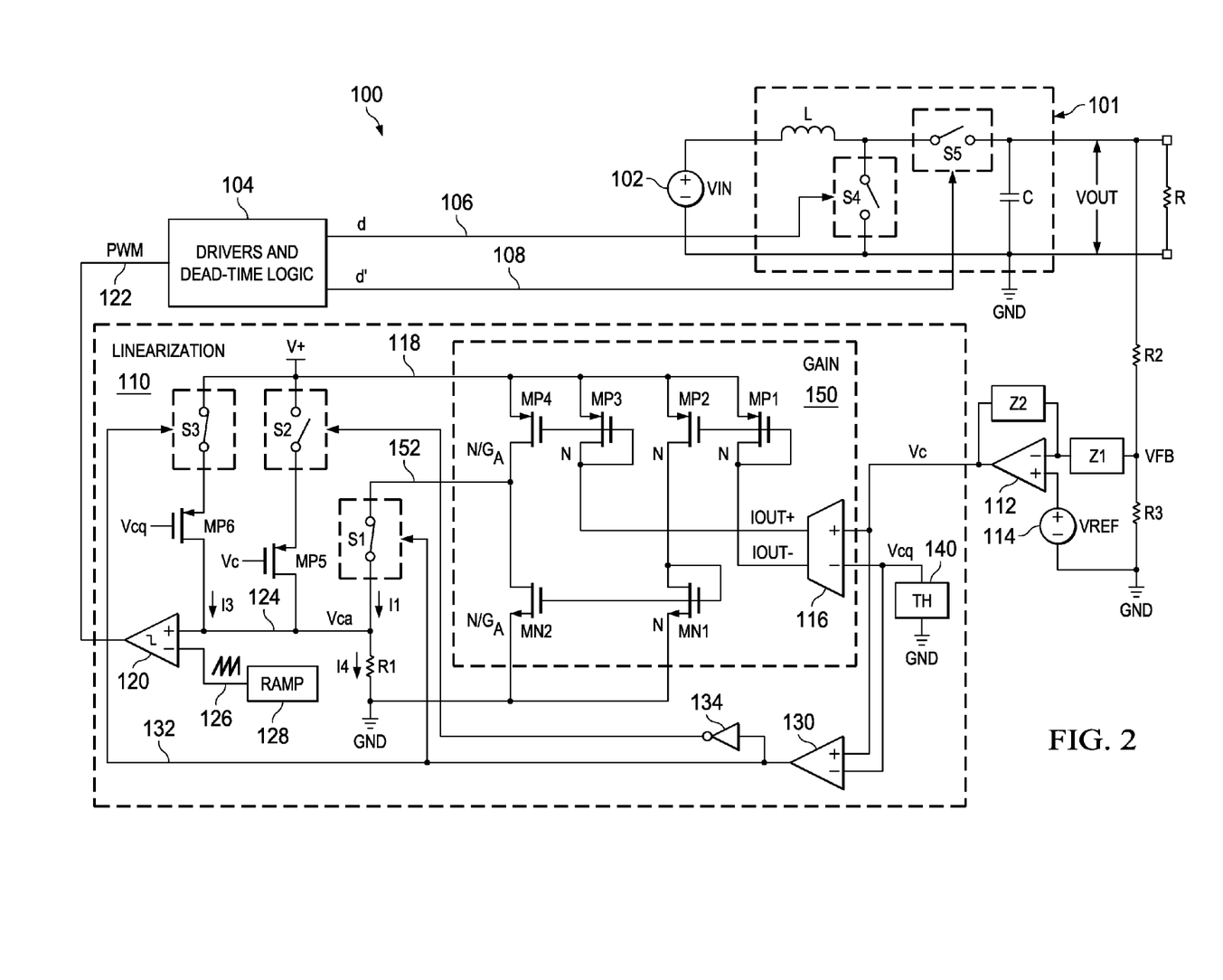
FIG. 2 is a schematic diagram of the system with the linearization apparatus operating in a second mode for higher duty cycles to selectively linearize the conversion gain by pulse with modulation according to a threshold signal and a gain circuit output signal.

FIGS. 1 and 2 show a power conversion system 100 with a boost DC-DC converter stage or circuit 101 having an input receiving a DC input signal from a DC input source or supply 102, such as a DC input voltage signal VIN. The circuit 101 also includes a converter output providing a DC output signal (e.g., voltage) VOUT to power a connected load R. The DC-DC converter circuit 101 is a boost converter with an inductor L coupled between the input and a switching node, with a switch S4 connected between the switching node and a constant voltage node GND, and a second switch S5 connected between the switching node and a positive output node. In other examples, the switch S5 can be replaced with a diode (not shown) to implement a boost converter circuit 101 with at least one switching device (S4) coupled between the input and output of the converter circuit 101. An output capacitance C is connected between the positive output terminal and GND. Examples of suitable switching devices S4 and S5 and other switches in the system 100 include bipolar transistors, MOSFETs, IGBTs, IGCTs and other devices operable according to a corresponding switching control signal to be in a first conductive state or a second non-conductive state. The switches S4 and S5 of the boost converter circuit 101 are driven by switching control signals d and d' provided by a driver and dead-time logic circuit 104 along switching control lines 106 and 108, respectively. The switching control signals d and d' are provided from the circuit 104 as pulse width modulated (PWM) signals for selectively opening and closing the corresponding switches S4 and S5 according to a pulse width modulated signal "PWM" provided from a linearization circuit 110 along a connection 122. The circuit 104 provides the signals d and d' in complimentary fashion to selectively turn the main boost converter switch S4 on while S5 is turned off to store energy in the inductor L, and S4 is then turned off while S5 is turned on to charge the output capacitance C using current from the inductor L. In one example, the circuitry 104 provides a controlled "dead-time" between switching state changes during which both switches S4 and S5 are off. Pulse width modulated switching operation of S4 and S5 (or just S4 with S5 replaced by a diode) controls the amplitude of the DC output signal VOUT.

The output voltage VOUT is sensed by a feedback circuit including a resistive voltage divider formed by resistors R2 and R3 connected between the positive DC output node and GND to provide a feedback voltage signal VFB. The feedback signal VFB is provided to a compensation circuit including an op amp 112 with an input impedance Z1 connecting the feedback voltage signal VFB to an inverting input (−) and a feedback impedance Z2 connected between the inverting input and the op amp output to provide a first compensation signal, in this example a voltage signal Vc to the linearization circuit 110. The non-inverting (+) input of the op amp 112 is provided with a reference voltage signal VREF from a voltage source 114. The feedback voltage divider circuit R2, R3 and the compensation circuit impedances Z1 and Z2 set the amplitude of the first compensation signal Vc according to the DC output signal VOUT and the reference signal VREF. The reference signal VREF operates as a setpoint for closed loop regulation of the converter output voltage signal VOUT. The first compensation signal Vc at any given time represents an output error or difference between the reference signal VREF and the DC-DC converter output signal VOUT scaled by the resistive divider as the feedback voltage signal VFB.

Figure 8:
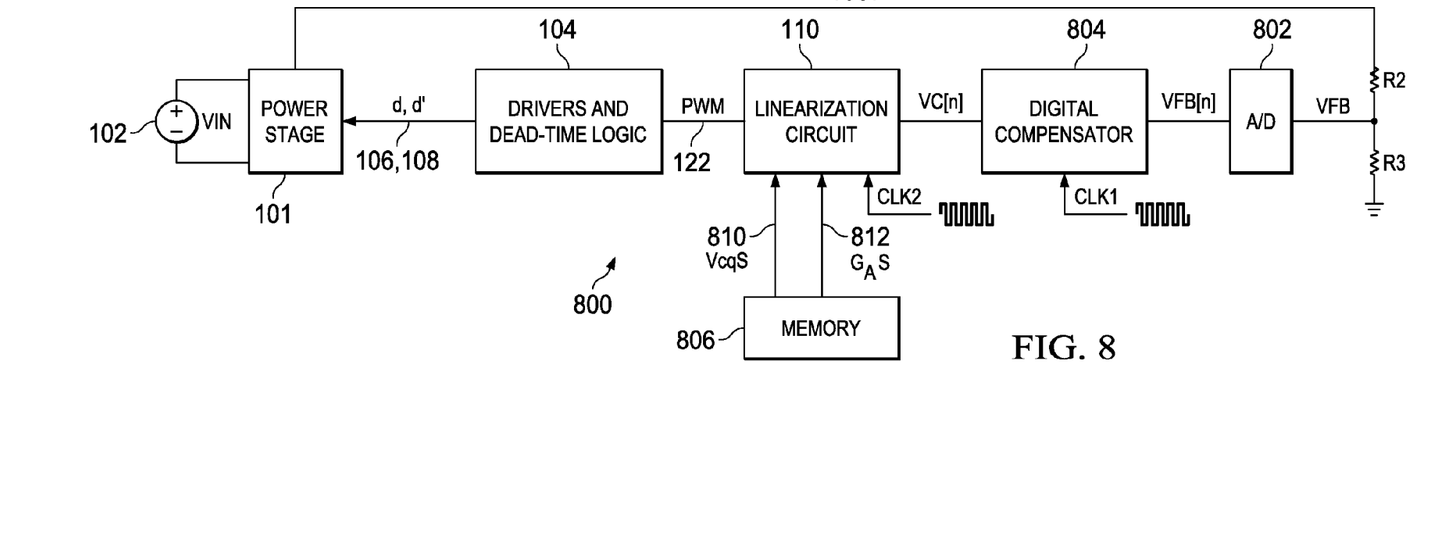
FIG. 8 is a schematic diagram of a DC-DC power conversion system with a linearization apparatus using digital control.
Figure 10:
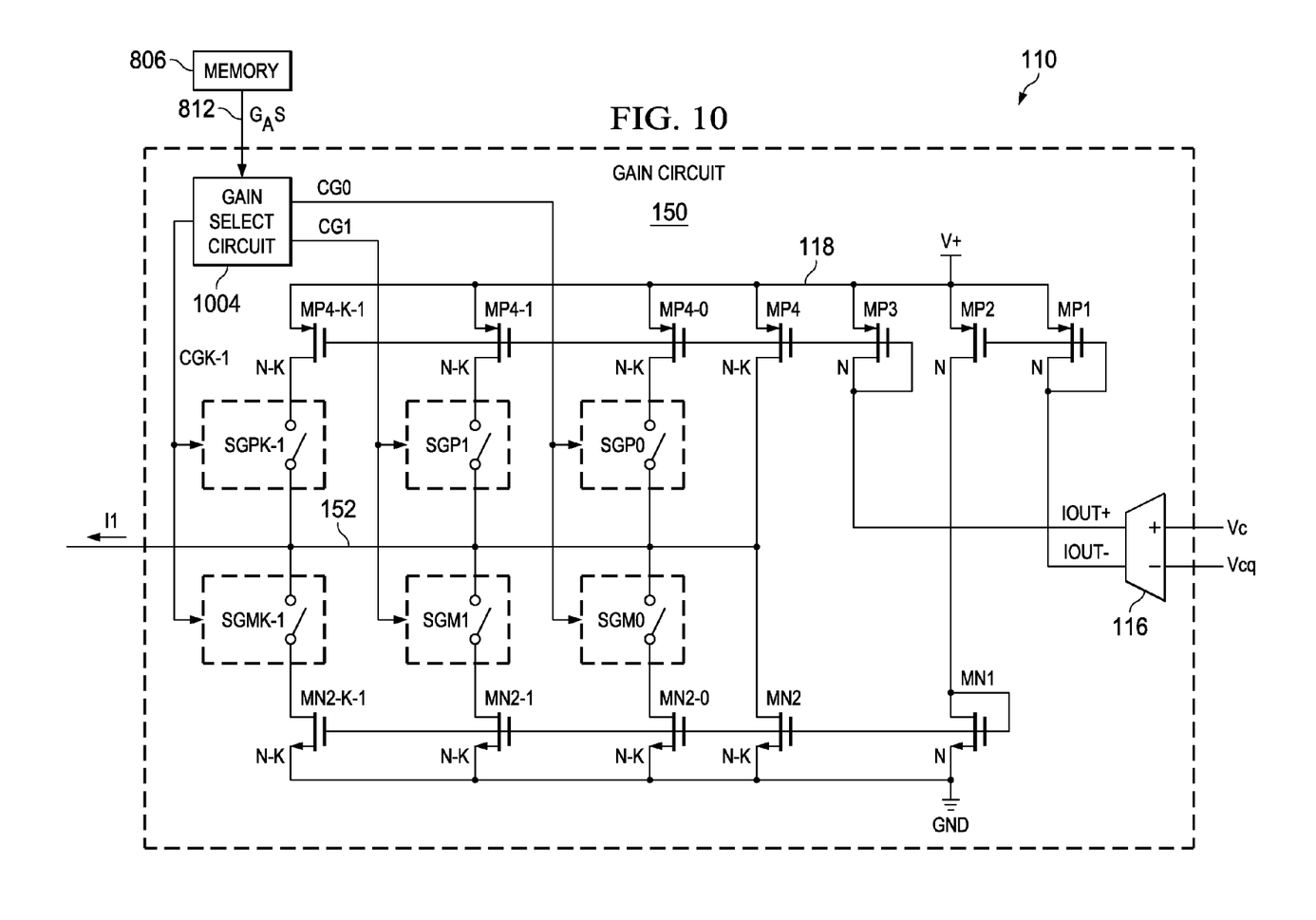
FIG. 10 is a schematic diagram of an adjustable gain circuit for selectively adjusting the gain value in the system of FIGS. 1, 2 and 6.

The linearization apparatus 110 includes a gain circuit 150 with inputs receiving the first compensation signal Vc and a threshold signal, such as a voltage Vcq from a threshold circuit 140. Unless otherwise specified herein, a signal can be an analog current or voltage, or a digital value. The gain circuit 150 includes an output 152 which provides a gain circuit output signal, such as a current signal I1 (FIG. 2), according to a non-zero gain value $G_A$ and the difference Vc−Vcq between the first compensation signal Vc and the threshold signal Vcq. The linearization circuit 110 selectively uses the gain circuit output signal I1 at high duty cycle operation to at least partially linearize the DC-DC converter circuit conversion gain M representing the output-to-input ratio of the system 100 (e.g., M=VOUT/VIN). At first compensation signal levels Vc less than the threshold Vcq, the linearization circuit 110 operates in a first mode to provide the signal PWM to the driver and dead-time logic circuit 104 according to the first compensation signal Vc. At higher values of Vc greater than or equal to the threshold signal Vcq, the linearization circuit 110 provides the signal PWM according to the threshold signal Vcq and the gain circuit output signal I1 in a second operating mode. In the example of FIGS. 1 and 2, the closed loop control of the system 100 is therefore adjusted for higher duty cycle operation to linearize the gain M by adapting the duty cycle D as a function of the gain value $G_A$ and the difference Vc−Vcq. In one example, the pulse width modulation is controlled in the second mode according to a second compensation signal Vca which is proportional to (Vc−Vcq)/$G_A$. The gain value $G_A$ is adjustable in some implementations, for example as shown in FIGS. 8 and 10 below. In one example, the gain value $G_A$ is greater than 1.0. In this manner, the overall system conversion gain M is selectively lowered for duty cycles D above a threshold value $D_Q$ where $D_Q$ corresponds to Vcq.

In the example of FIGS. 1 and 2, the linearization apparatus 110 implements dual mode operation for selectively adapting the system gain for higher duty cycles using a switching circuit including switches S1-S3 as well as PMOS transistors MP5 and MP6, and a PWM circuit including a comparator 120, a resistor R1 in a ramp generator circuit 128. The comparator 120 includes a non-inverting (+) first input 124 receiving the second compensation signal Vca established by a current I4 flowing from the first input node 124 to GND through the resistor R1. The switches S1-S3 selectively provide one or more currents to the summing junction formed at the node 124 according to the operating mode of the linearization apparatus 110 to establish the second compensation signal Vca as a voltage at the node 124. The ramp generator 128 provides a ramp or other repeating voltage signal to an inverting (−) second input 126 of the comparator 120. The comparator 120 includes an output 122 operative to provide the signal PWM to control the output signal VOUT of the DC-DC converter circuit 101. The voltage across the resistance R1 provides the second compensation signal Vca as a voltage at the first comparator input 124 for comparison with the ramp signal at the second comparator input 126. The continuous comparison of the voltages at the inputs 124 and 126 provides a pulse width modulated signal PWM from the comparator output to the driver and dead-time logic circuit 104 to generate the switching control signals d and d' on the lines 106 and 108 for operating the boost converter switches S4 and S5.

The linearization circuit apparatus 110 also includes a second comparator circuit 130 receiving the first compensation signal Vc and the threshold signal Vcq at + and − inputs, respectively. The comparator 130 has an output 132 providing a mode control signal to the switches S1 and S3, and also to an inverter 134 to operate the switch S2 to control the operating mode of the linearization apparatus 110. The comparator 130 places the linearization apparatus 110 in the first mode if Vc is below Vcq, and places the linearization apparatus 110 in the second mode if Vc is greater than or equal to Vcq.

The switching circuit includes a first switch S1 operative in the first mode disconnect the output 152 of the gain circuit 150 from the first comparator input 124, and in the second mode to provide a first current signal I1 from the gain circuit 150 to the first comparator input 124. A second switch S2 allows a second current I2 to flow into the first comparator input 124 in the first mode. The second current I2 is proportional to the first compensation signal Vc by operation of the transistor MP5 with a source connected through the switch S2 to a positive supply voltage V+ at a positive voltage node 118, and a drain connected to the non-inverting first comparator input 124. The gate of MP5 is driven by the first compensation signal voltage Vc and thus the current I2 flowing into the comparator input 124 in the first mode is proportional to the first compensation signal Vc. In the second mode, the second switch S2 is open or off to prevent flow of the second current I2 into the first comparator input 124. The switching circuit also includes a third switch S3 connected in series with the transistor MP6 between V+ and the comparator input 124. The transistor MP6 has a gate controlled by the threshold signal voltage Vcq, and when the switch S3 is closed (FIG. 2), a corresponding current I3, which is proportional to the threshold signal Vcq, flows into the resistor R1 along with the first current I1 from the gain circuit 150 (through capital S1).

The gain circuit 150 has an output 152 providing the gain circuit output signal as a current I1 in this example based on a ratio of the difference Vc−Vcq between the first compensation signal Vc and the threshold signal Vcq to the gain value $G_A$. The gain circuit 150 includes a transconductance amplifier (GMA) 116 receiving the first compensation signal Vc and the threshold signal Vcq at + and − inputs, respectively, along with a differential current mirror circuit formed by N-channel transistors MN1 and MN2 and P-channel transistors MP1, MP2, MP3 and MP4. The relative sizing of the current minor transistors and the gain circuit 150 provides for scaling of the transconductance amplifier output currents IOUT+ and IOUT− by the gain value $G_A$ such that the resulting gain circuit output signal current I1 is proportional to (Vc−Vcq)/$G_A$. In one example, the transistors MP1, MP2 and MN1 form a unity gain current mirror with a current flowing through MP2 and in MN1 equal to IOUT− from the transconductance amplifier 116. The transistors MP1, MP2 and MN1 in one example are individually fabricated using an integer number N transistors substantially equal in terms of width w and length l. The transistor MP3 is also of the same size (N*w/l). Transistors MP4 and MN2 are smaller in one example, individually formed using an integer number N/$G_A$ transistors of size w/l. The transistors MN1 and MN2 form a current minor to conduct a current through MN2 proportional to the current through MN1 scaled by the gain value $G_A$ (e.g., IOUT−/$G_A$). MP3 and MP4 form a current mirror with respect to the transconductance amplifier output current IOUT+ flowing in MP3, and the current flowing through MP4 is proportional to the current through MN3 scaled by the gain value $G_A$ (e.g., IOUT+/$G_A$). This establishes a differential current signal I1 at the gain circuit output node 152 joining MP4 and MN2 which is proportional to (Vc−Vcq)/$G_A$. During high duty cycle operation (D>$D_Q$, Vc>Vcq), the comparator 130 enables switches S1 and S3 and disables switch S2. The voltage to current converter or transconductance amplifier 112 is used to convert the difference between Vc and Vcq to current, and the current is reduced in the gain circuit 150 by the gain value $G_A$ to obtain a linearized duty ratio $D_{Q+}\Delta D/G_A$.

Where $G_A$ is greater than 1.0, the gain circuit 150 provides the gain circuit output signal as the first current I1 generally proportional to (Vc−Vcq)/$G_A$. In this example, the relative sizing of the transistors in the gain circuit 150 sets the gain value $G_A$. Different techniques can be used in other examples to set a non-unity gain value, including adjustable and/or programmable gain values, for example as shown in FIG. 10 below. Operation of the comparator 130 and the switches S1-S3 provides the current I2 through the resistor R1 such that the PWM signal provided by the comparator 120 has a duty cycle set according to the first compensation signal Vc in the first mode when Vc is less than Vcq. FIG. 1 shows the switching circuit configuration during the first mode. In the second mode when Vc is greater than or equal to Vcq, S1 and S3 are closed and S2 is open as shown in FIG. 2. The current I4 through the resistor R1 is the sum of the currents I1 and I3 in the second mode, and the resulting second compensation signal voltage Vca at the first comparator input node 124 is proportional to Vcq+(Vc−Vcq)/$G_A$.

Figure 3:
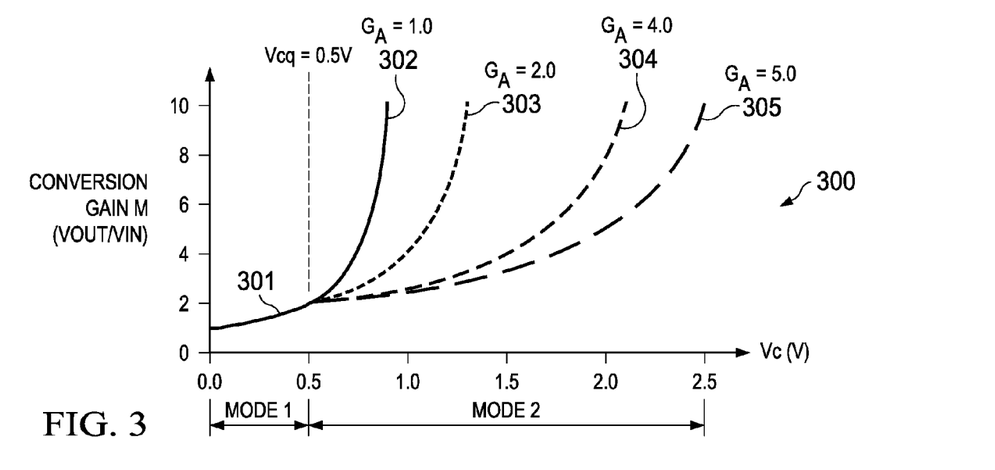
FIG. 3 is a graph of conversion gain as a function of the first compensation signal for various gain values in the system of FIGS. 1 and 2.
Figure 4:
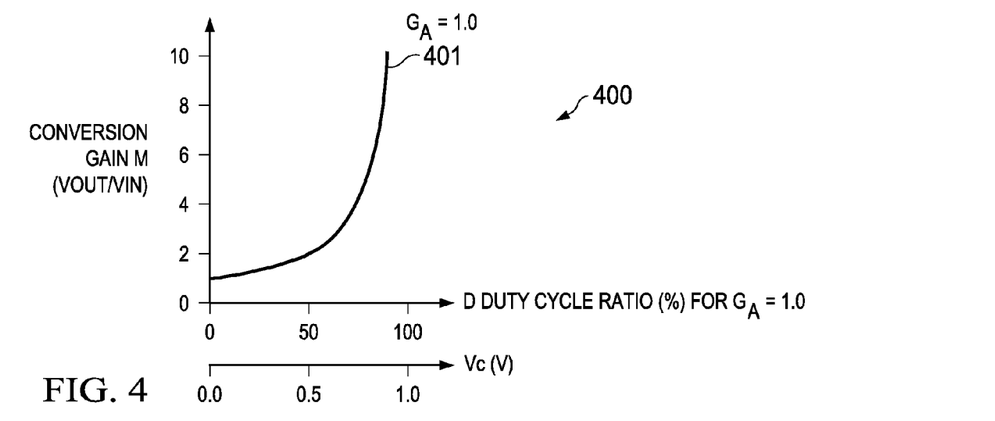
FIG. 4 is a graph of conversion gain as a function of duty cycle for a unity gain value in the system of FIGS. 1 and 2.
Figure 5:
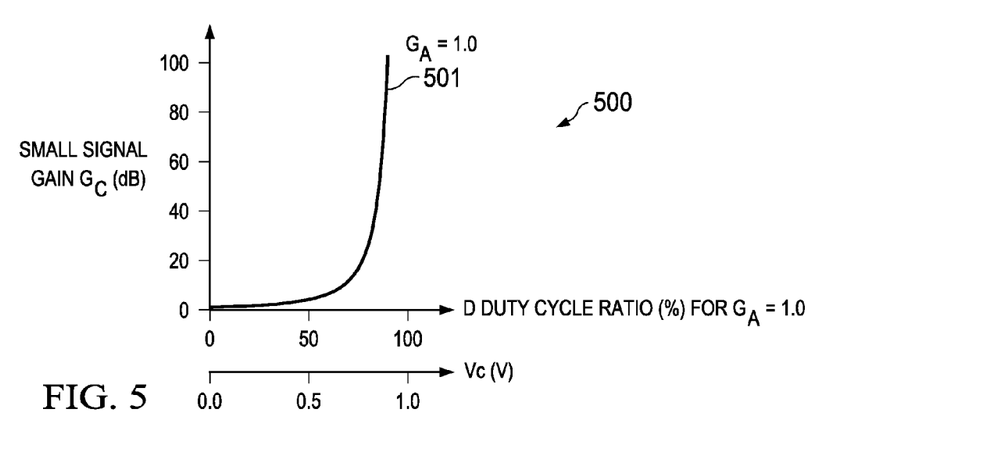
FIG. 5 is a graph of small signal gain as a function of duty cycle ratio and the first compensation signal for a unity gain value in the system of FIGS. 1 and 2.
Figure 9:
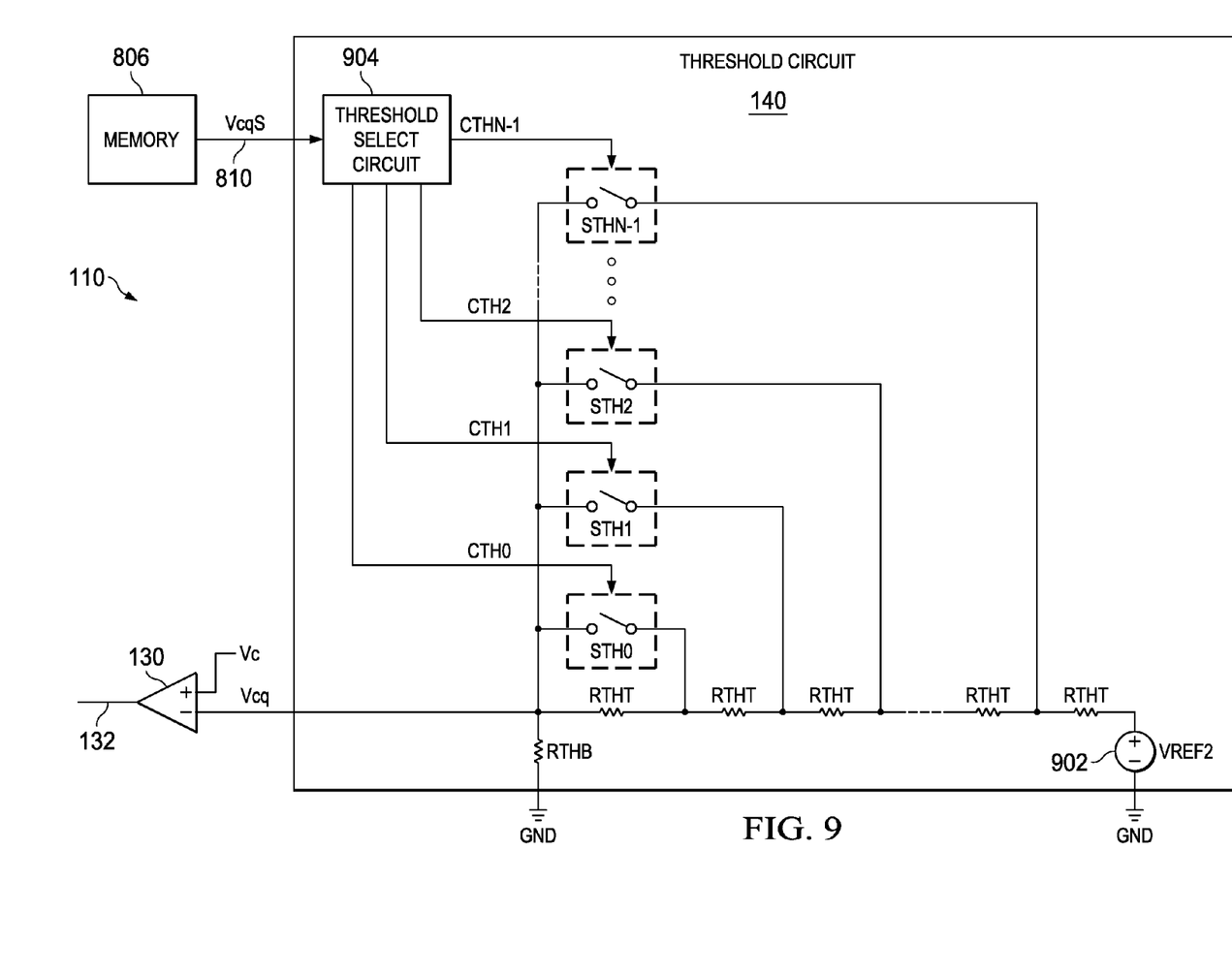
FIG. 9 is a schematic diagram of an adjustable threshold circuit for selectively adjusting the threshold signal in the systems of FIGS. 1, 2 and 6.

FIGS. 3-5 illustrate graphs of conversion gain and small signal gain as a function of the first compensation signal Vc and the corresponding duty cycle ratio D at various operating points in the power conversion system 100 of FIGS. 1 and 2. A graph 300 in FIG. 3 shows the system conversion gain M (M=VOUT/VIN) as a function of the first compensation signal Vc for various gain values in the system of FIGS. 1 and 2. In the example of FIGS. 3-5, the first compensation voltage Vc is established by the resistors R2 and R3 (FIGS. 1 and 2) where Vc=1.0 V represents 100% duty cycle (D=1.0) for a unity gain value $G_A$=1.0. Also, the threshold signal Vcq is set to a voltage of 0.5 V in this example, corresponding to 50% duty cycle ratio D for unity gain value $G_A$=1.0. Other voltage values and scaling can be used in other examples. In certain examples, different threshold signal levels Vcq can be used, and the threshold signal Vcq is adjustable and/or programmable in certain embodiments, for example, as shown in FIG. 9 below.

Curve 301 in FIG. 3 shows operation of the linearization apparatus 110 in the first mode from 0.0≤Vc<0.5 where the system conversion gain M follows a rising conversion gain profile corresponding to a unity gain value $G_A$=1.0. Curve 302 shows continuation of this conversion gain M for Vc≥0.5 with $G_A$=1.0. A graph 400 in FIG. 4 shows a conversion gain curve 401 as a function of duty cycle ratio for a unity gain value, and the graph 500 in FIG. 5 illustrates a small signal gain curve 501 as a function of duty cycle ratio D and the first compensation signal Vc for a unity gain value in the system 100 of FIGS. 1 and 2. As seen in the curves 302, 401 and 501 in FIGS. 3-5, duty cycle values 0.5≤D≤0.8 correspond to 2.0≤M≤5.0, with the conversion gain curve 401 rising significantly above Vc=0.7. At unity gain value $G_A$, therefore, large conversion gains M higher than 5 are largely impractical due to need for extreme duty cycle operation, and the steep rise in the small signal gain curve 501 demonstrates the susceptibility to instability and noise at such high duty cycle operation.

To address these shortcomings, the linearization apparatus 110 advantageously allows the gain value $G_A$ to be set in certain examples greater than unity. This, in turn, extends the rising conversion gain curves to higher first compensation signal levels Vc. For example, the curve 303 in FIG. 3 shows system conversion gain with a gain value $G_A$=2.0, curve 304 shows system conversion gain for a gain value $G_A$=4.0, and curve 305 shows the conversion gain M using a gain value $G_A$=5.0. This feature of the system 100 and the linearization apparatus 110 facilitates improved stability and control for high duty cycle operation above the threshold signal level Vcq. Although the composite curves 301/303, 301/304 and 301/305 shown in FIG. 3 are not strictly linear, these composite curves are referred to herein as "linearized" as the composite curves are significantly more linear with respect to conversion gain M as a function of the first compensation signal Vc) that is the composite unity gain value curve 301/302. The selectively linearized system gain adaptation of the linearization apparatus 110 reduces the output variations in response to small duty cycle changes at higher conversion gains to enhance system stability and mitigate electromagnetic interference, noise and jitter in the system 100. At the same time, extension of the control range renders the system 100 more easily adaptable for use with smaller input voltages VIN (e.g., lower voltage battery sources, etc.) while providing output voltages VOUT at relatively high amplitudes useful for driving piezo-electric speakers, LED drivers, micro electromechanical device (MEMs) sensors, camera flash, USB on-the-go (USB-OTG) or other loads requiring voltages above the input supply level.

The apparatus 110 thus provides conversion gain linearization with selectively lowered gain M at higher duty cycle values D above a threshold $D_Q$ corresponding to the threshold signal Vcq. In operation, the difference Vc−Vcq between the current operating point Vc and the threshold Vcq is determined by the apparatus 110 and linearized with the chosen slope or gain value $G_A$. The difference ΔD between D and $D_Q$ is computed (ΔD=D−$D_Q$), which is used to compute a new linearized duty cycle D as Dq+(ΔD/$G_A$). The adjusted or linearized conversion gain M'=VOUT'/VIN' is given by the following equation (1):

$$M' = \frac{V_{out,Q}}{(1-D_Q)} \frac{1}{s^2 LC + \frac{L}{R}s + (1-D_Q)^2} + \frac{\Delta V_{out}}{\left(1-\frac{\Delta D}{G_A}\right)} \frac{1}{s^2 LC + \frac{L}{R}s + \left(1-\frac{\Delta D}{G_A}\right)^2}, \quad (1)$$

where L is the value of the DC-DC converter inductor L (FIGS. 1 and 2), C is the converter output capacitance C and "S" is the Laplace transfer operator.

The control transfer function thus provides unmodified behavior until $D_Q$ (corresponding to Vcq) to retain the useful part of high conversion gain curve and to linearize above this threshold point. The curves 303-305 in FIG. 3 show the new linearized conversion gain M as a function of the modified first compensation voltage $V_C$ for gain values $G_A$ of 2.0, 4.0 and 5.0. The modified conversion gain follows the $G_A$=1.0 curve 301 until the Vcq threshold and then follows a more linear path with a slope determined by $G_A$ for higher compensation voltages Vc. In one example, scaling of the gain circuit current minor transistors and the threshold signal setting Vcq allows the system 100 to be tailored to provide a linearization profile suitable for a given application.

The gain circuit 150 includes a current minor circuit to provide the gain circuit output signal as a current signal I1 proportional to the difference Vc−Vcq between the first compensation signal Vc and the threshold signal Vcq. The current minor circuit in some examples includes a plurality of selectable transistors to selectively adjust the gain value $G_A$, for example in FIG. 10 below. The example gain circuit 150 in the system 100 of FIGS. 1 and 2 uses a differential transconductance amplifier 116 and current minor circuitry along with the switching circuit to implement the adjusted second compensation signal Vca based on the difference Vc−Vcq between the first compensation signal Vc and the threshold signal Vcq with scaling by the gain value $G_A$. Different circuits can be used in other examples, whether based on current signals or voltage signals or combinations of currents and voltages. For example, summing amplifiers and difference amplifiers are used in other examples to implement the selective linearization operation with fixed or adjustable gain values $G_A$ and/or fixed or adjustable thresholds Vcq.

Figure 6:
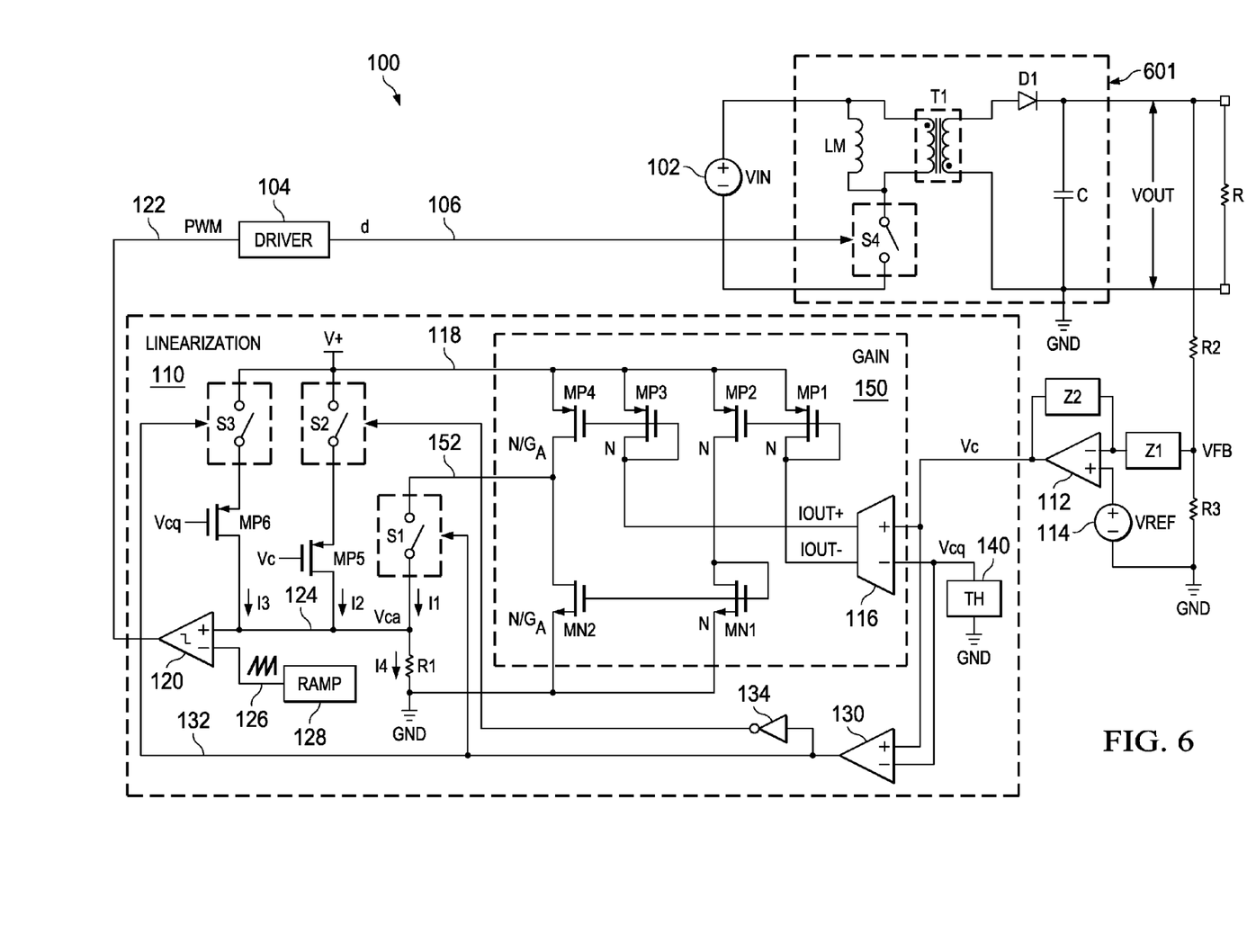
FIG. 6 is a schematic diagram of another power conversion system example including a flyback DC-DC converter stage and a linearization apparatus for selectively linearizing the DC-DC conversion gain.
Figure 7:
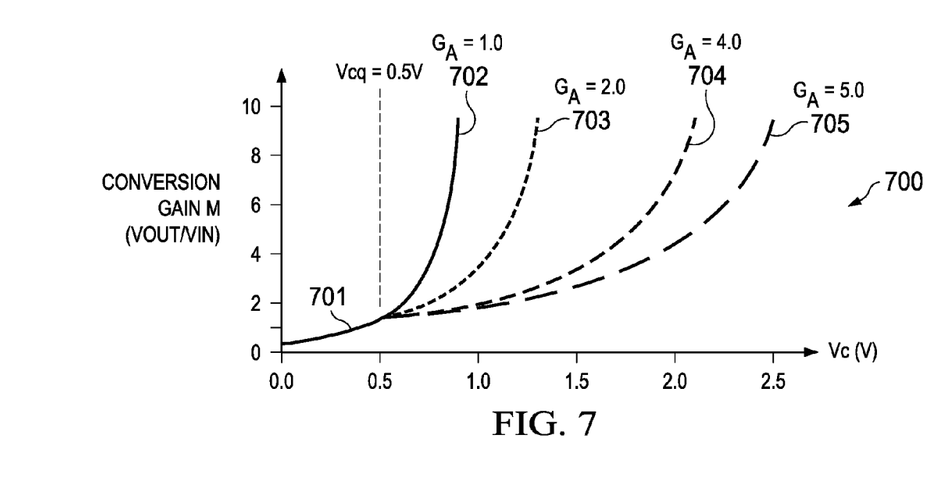
FIG. 7 is a graph of conversion gain as a function of the first compensation signal for various gain values in a buck-boost conversion system.

Referring now to FIGS. 6 and 7, other embodiments are possible in which the linearization apparatus is used in combination with other forms of DC-DC converter stage. FIG. 6 illustrates another power conversion system example 100 including a flyback converter stage circuit 601 with a switch S4 connected in series with a primary winding of a transformer T1 between the input source 102 and circuit ground GND, as well as an inductor LM connected in parallel with the transformer primary. The switch S4 in this case is operated according to a duty cycle controlled signal d from the driver on line 106. A secondary winding of the transformer T1 provides a rectified DC output across the output capacitance C via a rectifier diode D1 with an anode connected to the secondary winding and a cathode connected to the positive output terminal. The example in FIG. 6 also includes a linearization apparatus 110 as described above. An alternate example can use active rectification to replace the rectifier diode D1 of FIG. 6 with a switch for rectifying the output of the transformer secondary to provide a rectified DC voltage output across the output capacitance C.

In another example, the disclosed linearization apparatus and techniques can be used with a non-inverting buck-boost converter stage topology (buck cascaded with boost, not shown) when operating in boost mode. Synchronous non-inverting buck-boost examples are possible using a pair of switches, and other non-inverting buck-boost circuits can be used in combination with the described linearization circuitry 110 which can employ any suitable combination of at least one DC-DC converter switch with one or more diodes or further switches for DC-DC conversion operable at unity or higher gain. FIG. 7 provides a graph 700 showing conversion gain M including curves 701-705 as a function of the first compensation signal Vc for various gain values 1.0, 2.0, 4.0 and 5.0 in a buck-boost conversion system example. In this example, Vcq is again set to 0.5 V and the duty cycle D is 100% at 1.0 V for a gain value $G_A$=1.0. Unlike the boost converter example of FIGS. 1-5, the buck-boost converter circuit allows initial operation at low duty cycles (e.g., 0.0≤Vc≤0.3) at conversion gain values M below 1.0 (e.g., "buck" mode) with the output voltage VOUT less than the input voltage VIN. This is shown in the curve portion 701 which initially begins below 1.0 at low duty cycles. When Vc reaches or exceeds Vcq, the curve 702 shows the case for continued operation at a gain value of 1.0, and curves 703, 704 and 705 respectively show the selective linearization operation at gain values $G_A$ of 2.0, 4.0 and 5.0.

The selective conversion gain linearization shown in the curves 703-705 provides advantages in using the linearization apparatus 110 with respect to control stability and reduced EMI, noise and jitter relative to the unmodified operation shown in curve 702 for duty cycles above the threshold Vcq. In other examples, the linearization apparatus 110 may be employed in combination with other DC-DC converter stage circuitry operable above unity conversion gain, for example Cuk converters (not shown).

FIG. 8 illustrates a DC-DC power conversion system example 800 with a linearization apparatus 110 providing the functionality described above, where the system in this case uses digital control. The power stage 101 (e.g., a boost converter, a flyback converter, a buck-boost converter, Cuk converter) receives an input voltage signal VIN from a source 102 and provides an output voltage signal VOUT to a load (not shown). A feedback circuit including a resistive voltage divider formed by R2 and R3 provides a feedback voltage signal VFB to an analog-to-digital (A/D) converter 802. The A/D converter 802 provides a series of feedback voltage samples VFB[n] to a digital compensator circuit 804 operating according to a first clock input signal CLK1 to provide compensated voltage sample values VC[n] to a digital linearization circuit 110 operated according to a second input clock signal CLK2. The linearization circuit 110 in one example is adjustable or programmable, and receives a threshold setting value VcqS 810 from an electronic memory 806 and/or a gain value setting $G_A$S 812 from the memory 806.

In operation, the linearization circuit 110 provides a PWM signal 122 to a driver and dead-time logic circuit 104 to provide pulse width modulated switching control signals d and d' along lines 106 and 108 to operate the power stage 101 as described above. In addition, the digitally implemented linearization circuit 110 is programmed or otherwise configured to provide the PWM signal 122 according to the original or digitally compensated values VFB[n] or VC[n] for a first range of compensation values. After a threshold compensation value has been reached or exceeded, the linearization circuit 110 linearizes the system conversion gain M by modifying the values VFB[n] or VC[n] according to the VcqS and $G_A$S settings 810 and 812 from the memory 806.

FIG. 9 shows an example adjustable threshold circuit 140 allowing adjustment of the threshold signal Vcq in the systems 100 of FIGS. 1, 2 and 6. In this example, a reference voltage source 902 provides a threshold reference voltage VREF2. The circuit 140 includes a switchable resistive voltage divider circuit with an integer number N threshold adjustment switches STH0 through STHN-1 connected in a binary weighted fashion with a series connection of threshold voltage divider top side resistances RTHT. The top resistance and a bottom side voltage divider resistance RTHB provide the threshold signal Vcq at a select fraction of the threshold reference voltage VREF2. Any resistor sizes and relative resistances can be used. In one example, the bottom resistance RTHB has a value equal to N times the value of the individual top side resistances TRTH (RTHB=N*RTHT). In this example, the threshold voltage signal Vcq as a value equal to VREF2 times the total top side resistance for the top side resistors RTHT not bypassed or shorted by a corresponding one of the switches STH, divided by the sum of the bottom side resistance and the non-shorted top side resistance, allowing tailoring by activation of certain switches STH0 through STHN-1. In this example, a threshold select circuit 904 receives a desired threshold selection signal 810 (VcqS) from the memory 806 and provides a set of N corresponding binary-weighted threshold control signals CTH0, CTH1 . . . CTHN-1 to selectively tailor the adjustable threshold signal amplitude Vcq.

FIG. 10 illustrates an adjustable gain circuit example 150 for selectively adjusting the gain value $G_A$ in the system 100 of FIGS. 1, 2 and 6. In this case, the top and bottom side current mirrors include at least one switch-selectable branch with a mirrored pair of P-channel and N-channel transistors MP4 and MN2 and corresponding plus and minus side switches for selectively modifying the current I1 provided to the gain circuit output node 152. A gain select circuit 1004 in one example receives a gain value $G_A$S select signal 812 ($G_A$S) from the memory 806 and generates a corresponding set of K gain control signals CG0, GC1 . . . CGK-1 to operate the corresponding pairs of branch switches SGP and SGM. In one example, MP4-0, SGP0, SGM0 and MN2-0 form a first switchable branch operated according to control signal CG0. Another selectable branch circuit includes MP4-1, SGP1, SGM1 and MN2-1 controlled by a signal CG1. An integer number K switch selectable branch circuits are provided including a final branch formed by MP4-K-1, SGPK-1, SGMK-1 and MN2-K-1 and controlled by signal CGK-1, where K is an integer greater than 0. In this example, the selectable positive side transistors MP4-0, MP4-1 . . . MP4-K-1 are sized the same as MP4 (N−K) and the negative side mirror transistors MN2-0, MN2-1 . . . MN2-K-1 are sized the same as MN2 (N−K), with the other mirror transistors MP1-MP3 and MN1 sized the same as one another (N times the unit w/l). The gain select circuit 1004 in this example provides a range of adjustable or programmable gain values $G_A$ ranging from a value of 1.0 with all the switches closed, a gain of 2.0 with only one pair of switches open, a gain of 4.0 with two pairs of switches open, etc.

Figure 11:
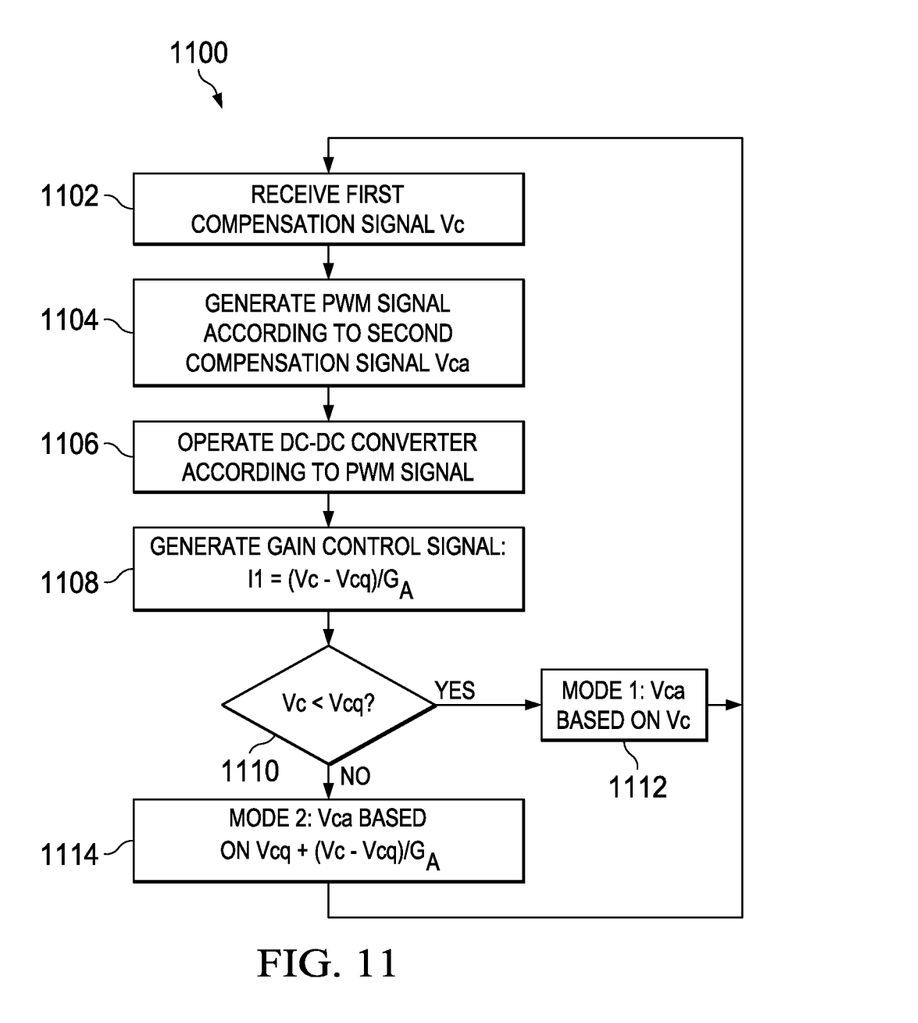
FIG. 11 is a flow diagram of a method of linearizing a DC-DC conversion gain.

FIG. 11 illustrates a method 1100 of linearizing a conversion gain of a DC-DC converter circuit (e.g., circuits 101, 601 above). At 1102, a first compensation signal is received, such as a voltage signal Vc described above representing a difference between a DC-DC converter output signal (e.g., VOUT in FIGS. 1 and 2) and a reference signal (e.g., VREF). A PWM signal is generated at 1104 according to a second compensation signal (Vca), and the DC-DC converter is operated at 1106 according to the PWM signal. In this manner, one or more switches of a DC-DC converter are operated at least partially according to the second compensation signal Vca. At 1108 in FIG. 11, a gain circuit output signal is generated (e.g., I1) according to a non-zero gain value (e.g., $G_A$) and the difference between the first compensation signal and a threshold signal (I1 is proportional to (Vc−Vcg)/$G_A$). At 1110, a determination is made as to whether Vc is less than the threshold signal Vcq. If so (YES at 1110), the second compensation signal Vca is generated at 1112 based on Vc, and the process 1100 returns to 1102. Otherwise (NO at 1110), Vca is generated at 1114 based on the threshold signal Vcq and the gain circuit output signal I1 to selectively linearize the conversion gain of the DC-DC converter.

The present disclosure provides systems as well as apparatus and methods which can be employed to linearize the conversion gain duty cycle above a chosen operating point ($D_Q$). The disclosed examples work well in closed loop systems unlike most other solutions, and eliminate or reduce the problems associated high conversion ratio operation.

Disclosed examples also allow the flexibility to choose or parameterize the threshold and gain values $D_Q$ and $G_A$. The linearization apparatus 110 in certain examples facilitates extension of the range of operation of the converter circuit 101, 601 with a slope function of chosen gain, where certain implementations allow choice of the threshold signal and the gain value $D_Q$ (Vcq) and $G_A$ to implement any desired M v/s D curve. The resulting linearized conversion gain profile M facilitates reliable, stable high boost ratio in a single converter stage. In other examples, multiple thresholds and corresponding gain values can be implemented in a single linearization apparatus 110.

The disclosed solution facilitates desensitized operation of the converter system 100 with respect to transient line/load perturbations during high duty cycle operation due to the proposed linearized approach in closed loop operation. In addition, the concepts of the present disclosure may also be applied in open loop implementations. Also, the disclosed adjustable gain and/or threshold concepts may be implemented for on-chip programmability to facilitate use in various applications, such as driving LED strings of different lengths in lighting applications. In addition, the disclosed concepts and apparatus may be employed in boost as well as other DC-DC converter configurations, such as flyback, non-inverting buck-boost and Cuk designs operating in a boost mode. Also, the linearization apparatus 110 and the disclosed concepts can be used in existing open loop or closed loop designs in both continuous conduction mode (CCM) or discontinuous conduction mode (DCM) power conversion systems.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. An apparatus, comprising:
 a gain circuit comprising:
   an input for receiving a first compensation signal representing a difference between a DC output signal of a DC-DC converter and a reference signal;
   a current mirror circuit includes a plurality of selectable transistors to selectively adjust a non-zero gain value; and
   an output operative to provide a gain circuit output signal according to the non-zero gain value and a difference between the first compensation signal and a threshold signal; and
 a switching circuit comprising an input for receiving the gain circuit output signal and an output for providing a second compensation signal to a pulse width modulation (PWM) circuit to control the DC output signal of the DC-DC converter,
   the switching circuit operative in a first mode when the first compensation signal is less than the threshold signal to provide the second compensation signal according to the first compensation signal; and
   the switching circuit operative in a second mode when the first compensation signal is greater than or equal to the threshold signal to provide the second compensation signal according to the threshold signal and the gain circuit output signal to selectively linearize a conversion gain of the DC-DC converter.

2. The apparatus of claim 1, comprising a comparator circuit providing at least one mode control signal to selectively place the switching circuit in the first mode when the first compensation signal is less than the threshold signal, and to selectively place the switching circuit in the second mode to selectively linearize the conversion gain of the DC-DC converter circuit when the first compensation signal is greater than or equal to the threshold signal.

3. The apparatus of claim 1, wherein the current mirror circuit is operative to provide the gain circuit output signal based on a ratio of the difference between the first compensation signal and the threshold signal to the gain value.

4. The apparatus of claim 1, further comprising:
 an input for receiving at least one feedback signal representing the DC output signal of the DC-DC converter; and
 an output for providing the second compensation signal to control the output signal of the DC-DC converter.

5. The apparatus of claim 1, comprising a circuit for selectively adjusting the threshold signal.

6. The apparatus of claim 5, wherein the gain circuit includes a circuit for selectively adjusting the gain value.

7. The apparatus of claim 5, further comprising:
 a reference voltage source for providing a threshold reference voltage; and
 a switchable resistive voltage divider circuit for providing the threshold signal at a selected one of a plurality of different fractions of the threshold reference voltage.

8. The apparatus of claim 1, wherein the gain value is greater than 1.0.

9. An apparatus, comprising:
 a gain circuit comprising an input for receiving a first compensation signal representing a difference between a DC output signal of a DC-DC converter and a reference signal, and an output operative to provide a gain circuit output signal according to a non-zero gain value and a difference between the first compensation signal and a threshold signal; and
 a switching circuit comprising an input for receiving the gain circuit output signal and an output for providing a second compensation signal to a pulse width modulation (PWM) circuit to control the DC output signal of the DC-DC converter, the switching circuit comprising:
 a first switch operative in a first mode, when the first compensation signal is less than the threshold signal, to disconnect the output of the gain circuit from the first comparator input, and in a second mode, when the first compensation signal is greater than or equal to the threshold signal, to provide the first current signal to the first comparator input,
 a second switch operative in the first mode to allow a second current to flow into a first comparator input of a comparator, the second current proportional to the first compensation signal, the second switch operative in the second mode to prevent flow of the second current into the first comparator input, and
 a third switch operative in the second mode to allow a third current to flow into the first comparator input, the third current proportional to the threshold signal, the third switch operative in the first mode to prevent flow of the third current into the first comparator input.

10. The apparatus of claim 9, further comprising:
a pulse width modulation (PWM) circuit configured to provide a PWM signal to control the output signal of the DC-DC converter at least partially according to digital samples representing the DC output signal when a duty cycle of the DC-DC converter is below a duty cycle threshold, and to provide the PWM signal according to a reduced gain to selectively linearize the conversion gain of the DC-DC converter when the duty cycle of the DC-DC converter is greater than or equal to the duty cycle threshold; and wherein at least one of the duty cycle threshold and the reduced gain is programmable.

11. The apparatus of claim 9, further comprising:
a pulse width modulation (PWM) circuit, comprising:
the comparator having:
an output operative to provide a signal to control the output signal of the DC-DC converter,
the first comparator input, and
a second comparator input for receiving a ramp signal, and
a resistance coupled between the first input and a constant voltage node to provide the second compensation signal as a voltage at the first comparator input.

12. The apparatus of claim 9, wherein the gain circuit includes a current mirror circuit having a plurality of selectable transistors to selectively adjust a non-zero gain value proportional to a difference between the first compensation signal and the threshold signal.

13. The apparatus of claim 9, wherein:
the switching circuit operative in the first mode to provide the second compensation signal according to the first compensation signal; and
the switching circuit operative in the second mode to provide the second compensation signal according to the threshold signal and the gain circuit output signal to selectively linearize a conversion gain of the DC-DC converter.

14. The apparatus of claim 9, wherein the comparator is operative to provide at least one mode control signal to selectively place the switching circuit in the first mode when the first compensation signal is less than the threshold signal, and to selectively place the switching circuit in the second mode to selectively linearize the conversion gain of the DC-DC converter circuit when the first compensation signal is greater than or equal to the threshold signal.

15. The apparatus of claim 9, further comprising:
a circuit for selectively adjusting the threshold signal.

16. The apparatus of claim 9, further comprising:
a reference voltage source for providing a threshold reference voltage; and
a switchable resistive voltage divider circuit for providing the threshold signal at a selected one of a plurality of different fractions of the threshold reference voltage.

17. The apparatus of claim 9, wherein the gain value is greater than 1.0.

* * * * *